(12) United States Patent
Chang (10) Patent No.: US 7,021,347 B2
(45) Date of Patent: Apr. 4, 2006

(54) SNOW CHAIN FOR VEHICLE WHEELS

(76) Inventor: Chien-Chang Chang, 11F.-5, No.688, Sec. 4, Henan Rd., Nantun District, Taichung (TW) 408

( * ) Notice: Subject to any disclaimer, the term of this patent is extended or adjusted under 35 U.S.C. 154(b) by 8 days.

(21) Appl. No.: 10/693,943

(22) Filed: Oct. 28, 2003

(65) Prior Publication Data

US 2005/0087277 A1   Apr. 28, 2005

(51) Int. Cl.
*B60C 27/06*   (2006.01)
(52) U.S. Cl. .................... 152/219; 152/213 R; 152/233
(58) Field of Classification Search .............. 152/218, 152/225 R, 231, 233, 239, 241
See application file for complete search history.

(56) References Cited

U.S. PATENT DOCUMENTS 3,893,501 A * 7/1975 Brummer et al. ....... 152/213 R
4,234,028 A * 11/1980 Leftault, Jr. ................ 152/233
5,236,025 A *  8/1993 Maresh ...................... 152/219
5,837,075 A * 11/1998 Fu .......................... 152/213 A
6,345,653 B1 *  2/2002 Fu ............................. 152/219

* cited by examiner

*Primary Examiner*—Russell D. Stormer
(74) *Attorney, Agent, or Firm*—Bacon & Thomas PLLC (57) ABSTRACT

A snow chain to be mounted on a tire has a connection set having a plurality of planks, each of which has an arch portion and a connection portion. A radial chain set has a plurality of radial chains having ends coupled with the planks respectively. A main chain is coupled with distal ends of the radial chains, wherein the main chain has a hook device to connect opposite ends of the main chain into an annular form. A coupling assembly set has a plurality of coupling devices to tighten two of the planks, each of which has a rotary member and two connection member movably mounted on the rotary member.

4 Claims, 10 Drawing Sheets

SNOW CHAIN FOR VEHICLE WHEELS

BACKGROUND OF THE INVENTION

1. Field of the Invention

The present invention relates generally to a skidproof device for vehicle wheels, and more particularly to a snow chain to be mounted on a wheel of a vehicle.

2. Description of the Related Art

Under a normal environment, there is friction between wheels and ground, therefore, an automobile can run or stop. If there is ice or snow on the ground, the friction will be reduced or vanished and the automobile will lose control. It is dangerous to drive in snowing days. It has to mount snow chains on wheels of the automobile to increase the friction while driving in snowing days.

The conventional snow chains, however, have various designs and models, but they still have several drawbacks, such as difficult to be mounted on wheels. The snow chains are made by several chain rings and the snow chain is bent at where between the chain rings but each chain ring is rigid so that the snow chains can not be attached on the wheels completely. To mount the snow chain on the wheel, the snow chain has a portion being pressed under the wheel that will make the rest portion hard to be moved. It has to adjust the chain rings to the right positions one by one and that is very hard and takes lots of time. To mount the snow chain on the wheel is a heavy work, it's a hard job for a weak person, woman or a new hand and if the snow chain is not mounted firmly, the chain might be loosed and cause danger.

SUMMARY OF THE INVENTION

The primary objective of the present invention is to provide a snow chain, which can be mounted on a wheel in a simple, safe, fast and easy way.

According to the objective of the present invention, a snow chain comprises a connection set having a plurality of planks, each of which has an arch portion having a curvature meeting a curvature of a rim of a tire that the snow chain is mounted and a connection portion having a hook portion; a radial chain set having a plurality of radial chains having ends coupled with the planks respectively; a main chain coupled with distal ends of the radial chains, wherein the main chain has a hook device to connect opposite ends of the main chain into an annular form; a coupling assembly set having a plurality of coupling devices to tighten two of the planks, each of which has a rotary member and a connection member movably mounted on the rotary member, wherein the rotary member is turned to move the connection member outwardly or inwardly.

DETAILED DESCRIPTION OF THE INVENTION

Figure 1:
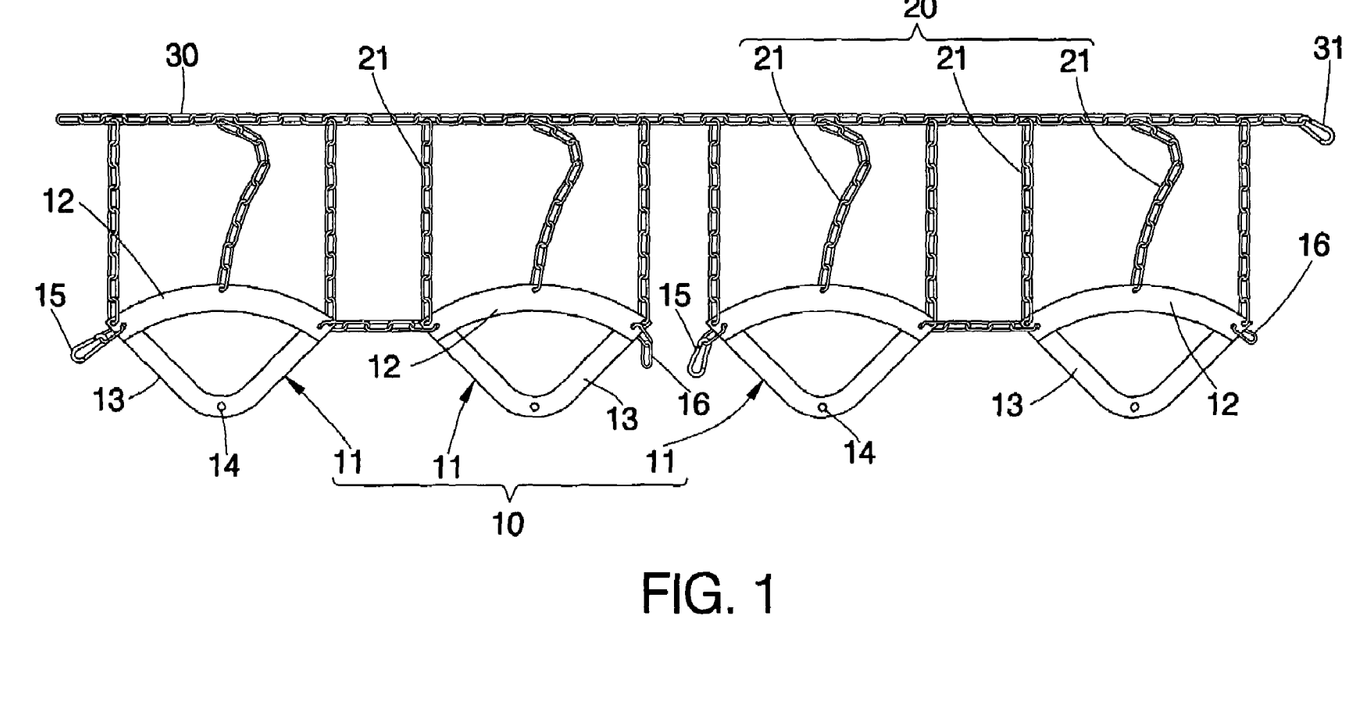
FIG. 1 is a perspective view of a first preferred embodiment of the present invention, which the snow chain is in an expanded form.
Figure 2:
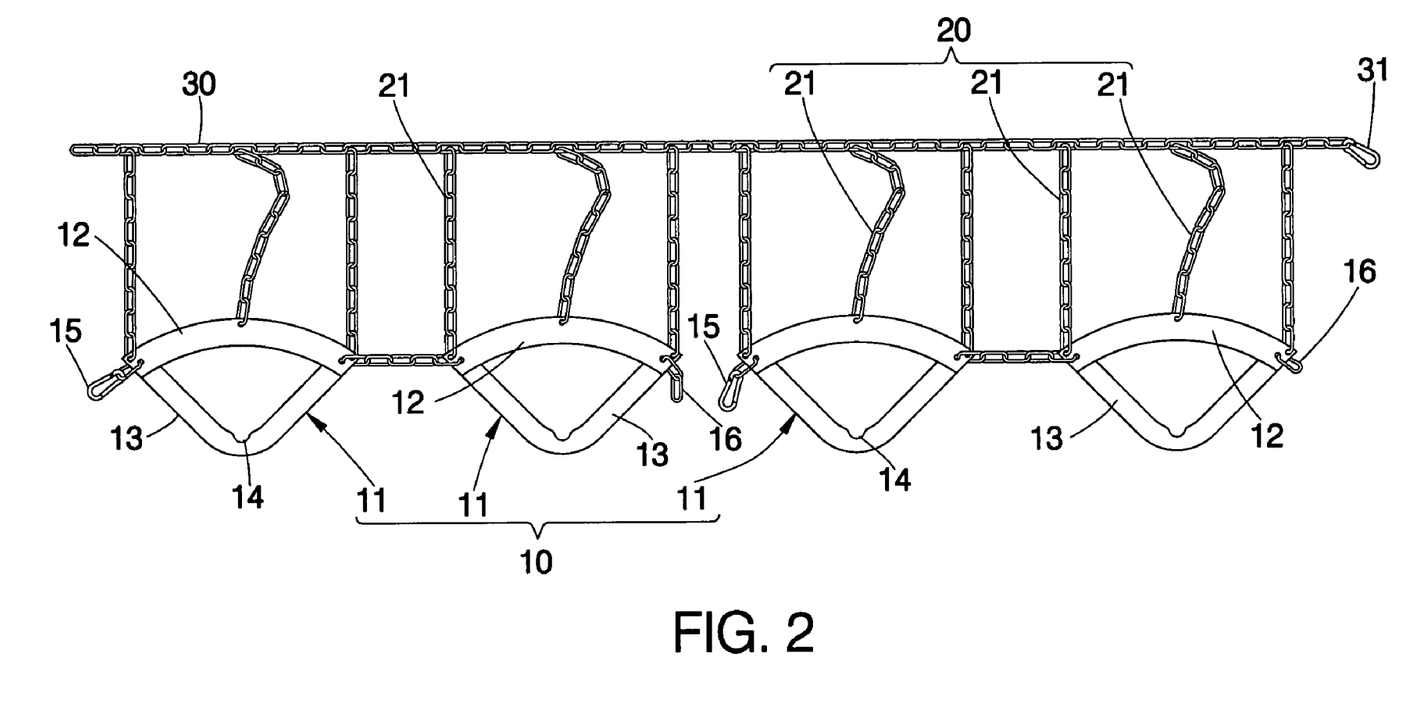
FIG. 2 is a perspective view of a second preferred embodiment of the present invention, which the snow chain is in an expanded form.

As shown in FIG. 1 and FIG. 2, a snow chain of the first preferred embodiment of the present invention comprises:

A connection set 10 has a plurality of planks 11 and the planks 11 are connected to each other by chains rings or other suitable devices. Each of the planks 11 respectively has an arch portion 12 at a side thereof. The arch portions 12 have a curvature respectively that meets the curvature of the rim of the tire. The planks 11 further have a connection portion 13 respectively on each of which has a hook portion 14. In the first preferred embodiment, there are four of the planks 12, namely the first, the second, the third and the fourth planks 12 from the left to right as shown in FIG. 1, wherein the first and the third planks 12 respectively are provided with a hook device 15 at a left side thereof and the second and the fourth planks 12 respectively are provided with a ring device 16 at a right side thereof. The hook devices 15 are coupled with the neighboring ring devices 16 respectively to connect the planks 12 in an annular form. The hook portions 14 can be rings, holes or recesses on the connection portions 13. The first preferred embodiment provides the hook portions 14 as holes recesses on the connection portions 13 respectively as shown in FIG. 1 and the second preferred embodiment provides the hook portions 14 as recesses on the connection portions 13 respectively as shown in FIG. 2.

A radial chain set 20 has a plurality of radial chains 21, each of which has an end thereof coupled with the arch portions 12 of the planks 11 respectively. In the first preferred embodiment, there are twelve of the radial chains 21 and each of the planks 11 has three of the radial chains 21 coupled therewith. In practice the number of the radial chains 21 is various and it depends on the real requirement of the snow chain.

A main chain 30 has a hook device 31 at an end thereof. The distal ends of the radial chains 21 are coupled with the main chain 30 respectively.

Figure 5:
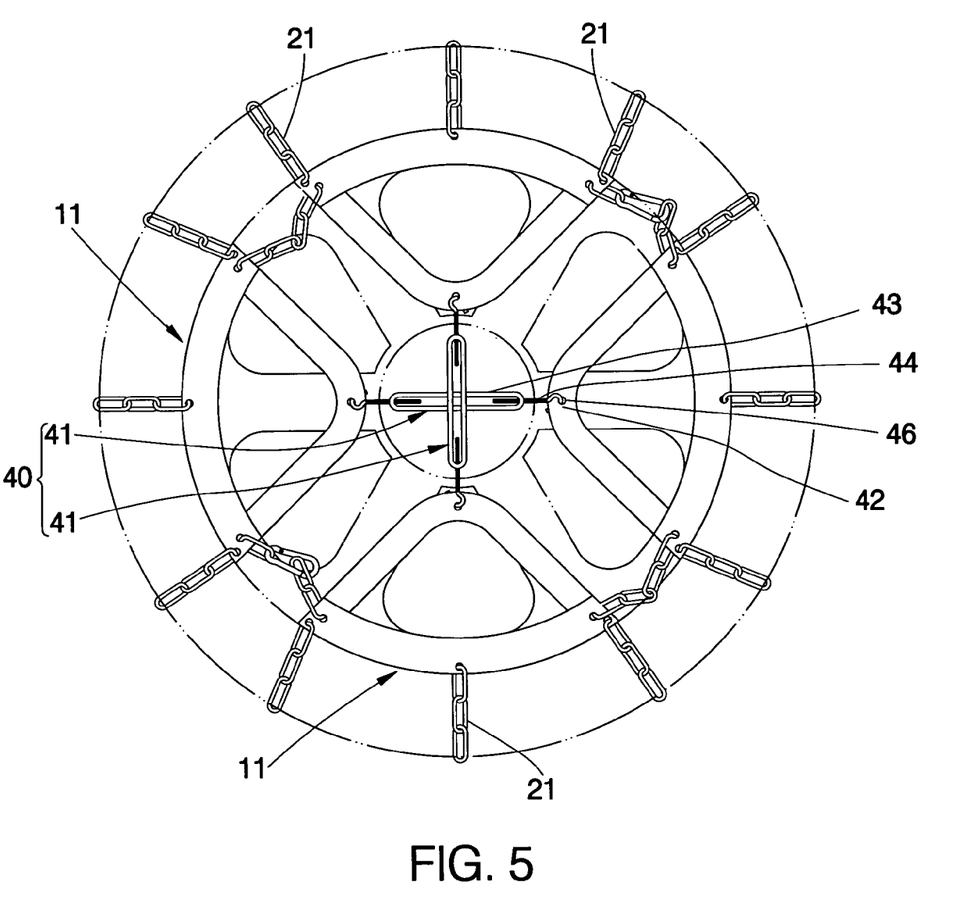
FIG. 5 is a front view of the wheel on which the snow chain of the first preferred embodiment is mounted and the coupling devices are mounted.
Figure 10:
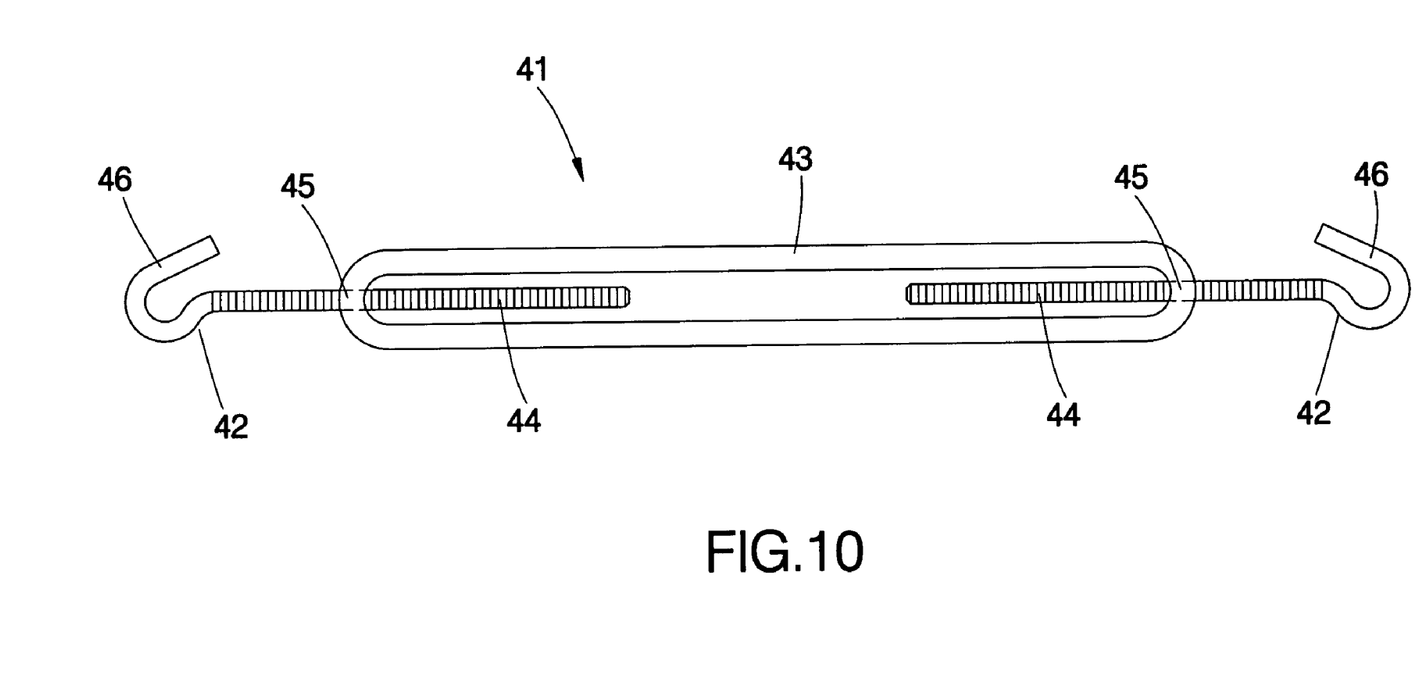
FIG. 10 is a perspective view of the coupling device used in the first preferred embodiment.

A coupling assembly set 40 has a plurality of coupling devices 41 as shown in FIG. 5 and FIG. 10. The coupling devices 41 each has two connection members 42 and a rotary member 43, wherein each of the coupling devices 41 has a thread section 44 and a hook 46 and the rotary member 43 has two thread holes 45 at opposite ends thereof and the connection members 42 are screwed into the thread holes 45 respectively. The orientations of the threads on the sidewall of the thread holes 45 are opposite so that rotates the rotary member 43 can make both of the connection members 42 moving outwardly or inwardly simultaneously.

Figure 3:
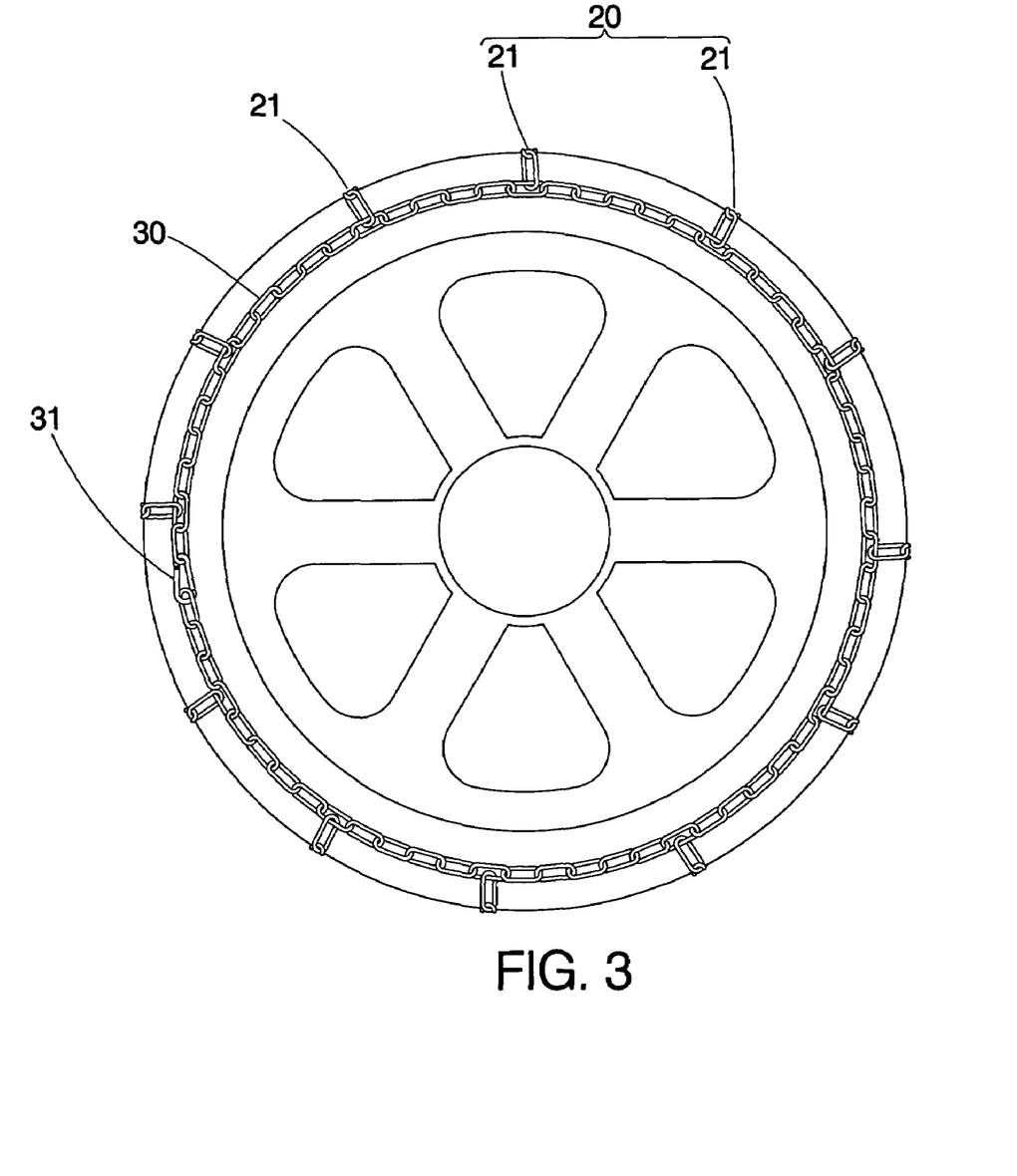
FIG. 3 is a back view of a wheel on which the snow chain of the first preferred embodiment is mounted.
Figure 4:
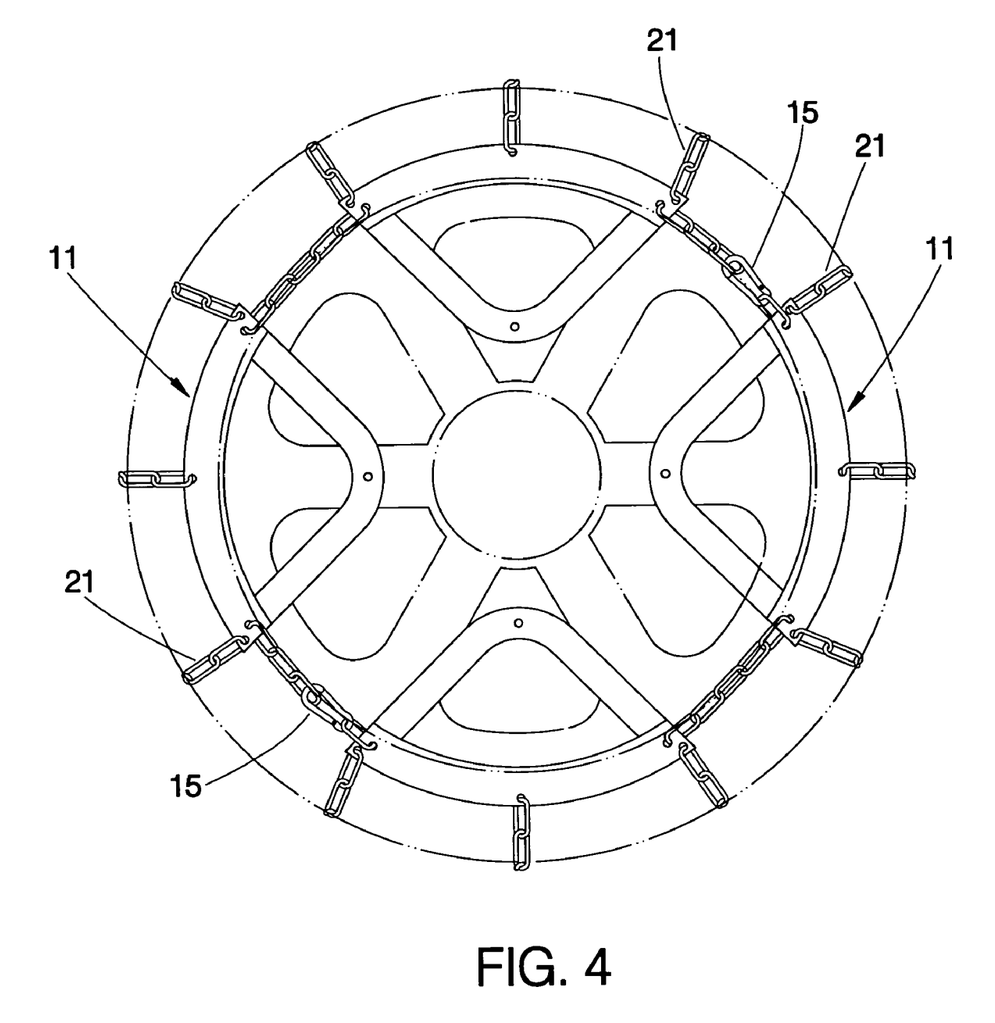
FIG. 4 is a front view of the wheel on which the snow chain of the first preferred embodiment is mounted.

As shown in FIG. 3 to FIG. 5, to mount the snow chain of the present invention on a tire, the main chain 30 is arranged on an interior side of the tire and the radial chains 21 lie on a tire thread of the tire. The hook device 31 is coupled with the other end of the main chain 30 to connect the main chain 30 into an annular chain as shown in FIG. 3.

As shown in FIG. 4, the planks 11 are left at an exterior side of the tire and user might exert the planks 11 to move the radial chains 21 to suitable positions. Each plank 11 is coupled with three of the radial chains 21, in other words, each plank 11 can move three radial chains 21 simultaneously that makes the radial chains 21 being moved to the suitable positions easier. After the radial chains 21 are moved to the suitable positions, the coupling devices 40 have the hooks 46 coupled with the hook portions 14 of the planks 11 respectively and the rotary members 43 are turned to pull the planks 11 tight as shown in FIG. 5. The rotary members 43 are rotated until the snow chain of the present invention is firmly mounted on the tire.

The present invention provides each plank coupled with a plurality of the radial chains respectively so that user holds one plank can move the radial chains and that make the adjustment the radial chains easier and faster. The present invention also provides the coupling devices to tighten the radial chains. The radial chains, therefore, are tightened equally.

The main art of the present invention is to provide the coupling devices tightening the planks and each plank is coupled with a plurality, of radial chains. User just has to move the planks to adjust the radial chains to the suitable positions and turn the coupling devices to tighten the radial chains. The radial chains are adjusted in an easier and fast way and are tightened equally. In practice, the length of the main chain and the number of the radial chains depend on the size of the wheel to be mounted. The number of the planks is various, such as FIG. 6 shows a snow chain having three planks and FIG. 7 shows six planks.

Figure 8:
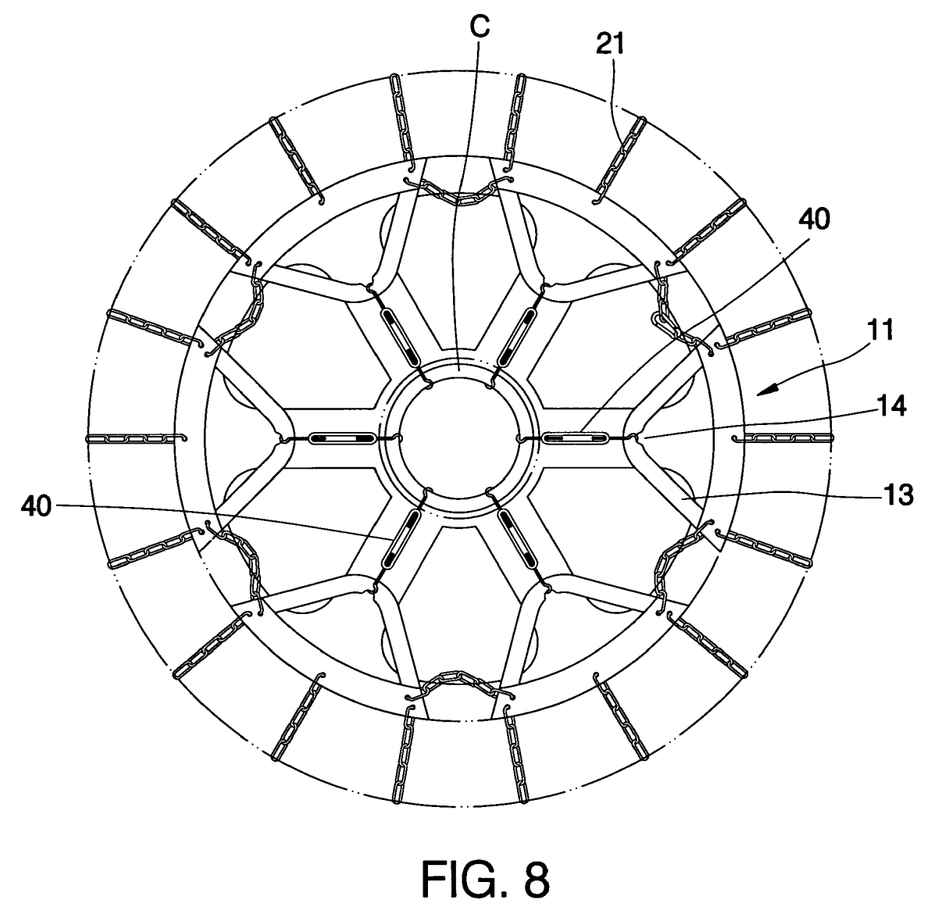
FIG. 8 is a front view of a wheel on which the snow chain of a fifth preferred embodiment is mounted.
Figure 9:
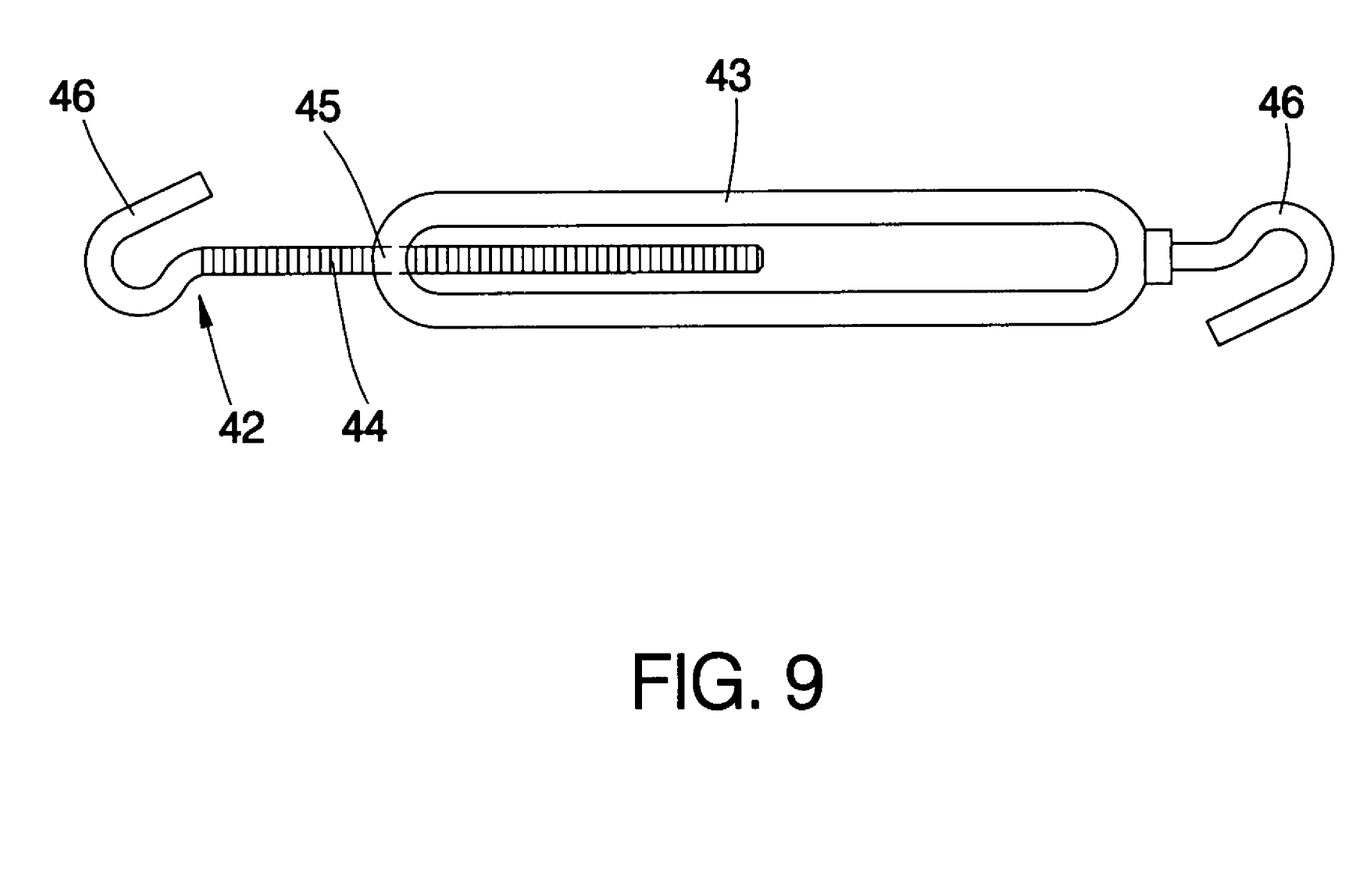
FIG. 9 is a perspective view of an alternate coupling device.

FIG. 8 shows a snow chain further comprising a ring C. The coupling devices 40 have ends coupled with the planks and the other ends thereof coupled with the ring C. FIG. 9 shows an alternate coupling device 41 having a rotary member 43, a fixed hooking portion 46 pivoted on an end of the rotary member 43 and a movable connection member 42 provided to the other end of the rotary member 43.

Figure 6:
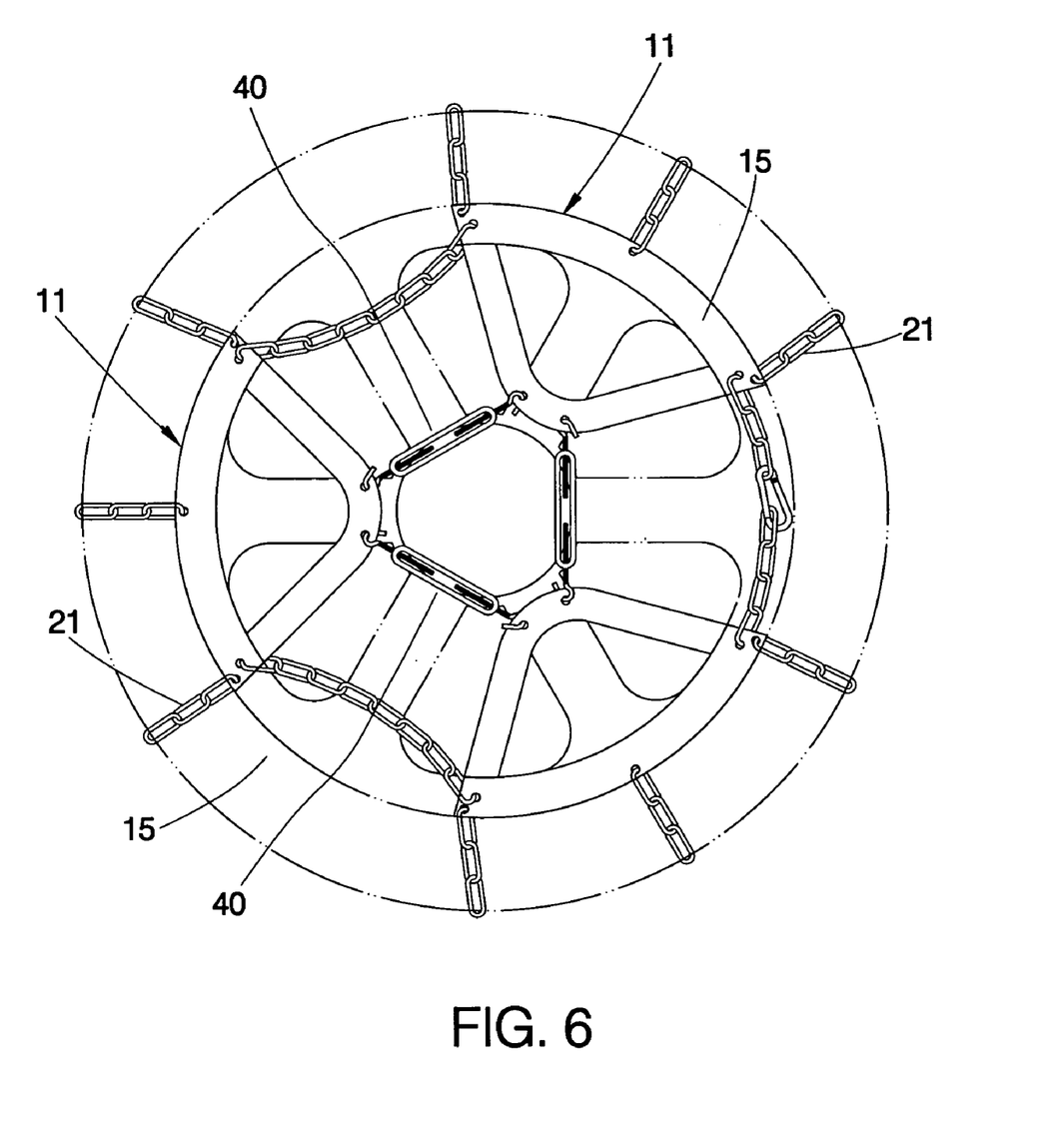
FIG. 6 is a front view of a wheel on which the snow chain of a third preferred embodiment is mounted.
Figure 7:
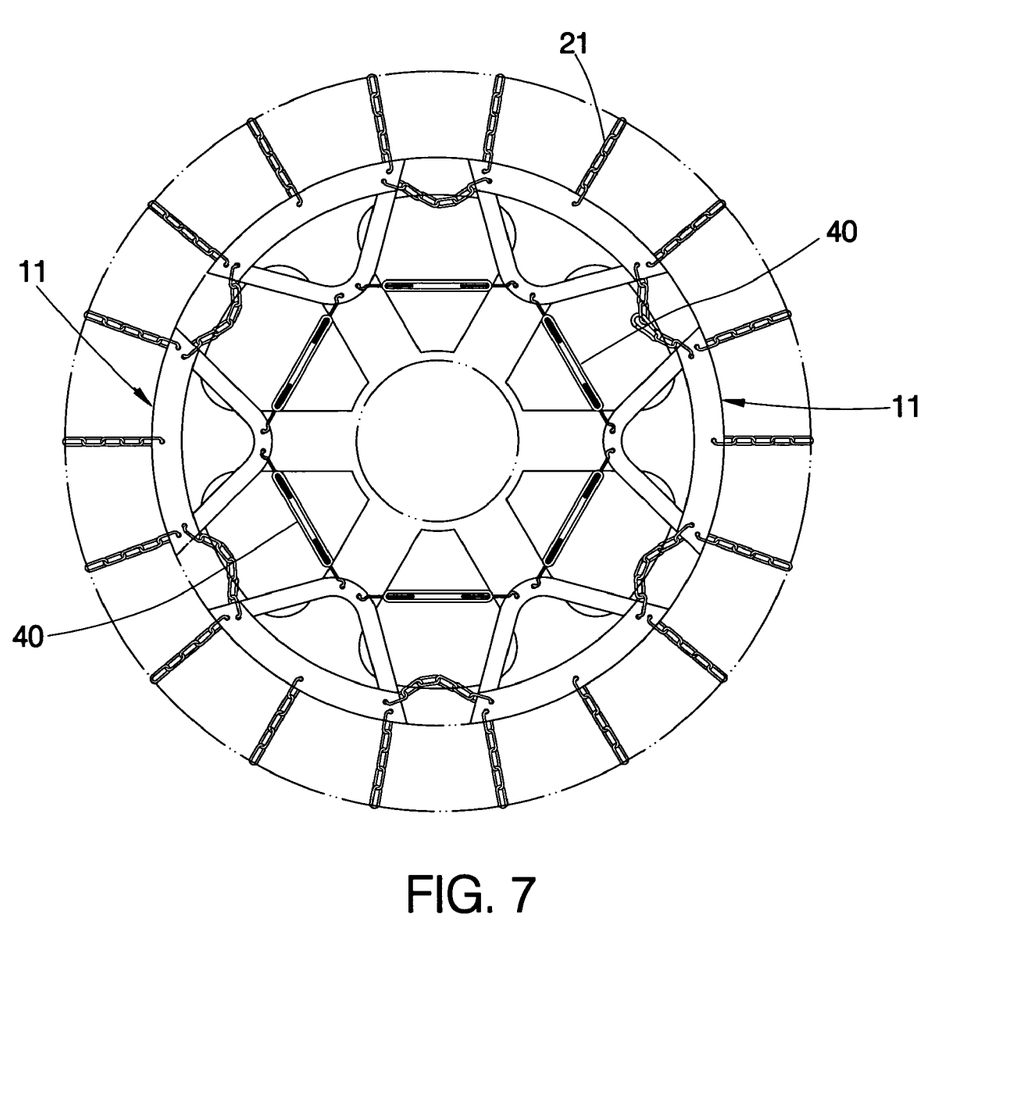
FIG. 7 is a front view of a wheel on which the snow chain of a fourth preferred embodiment is mounted.

FIG. 5 shows the coupling devices connecting two of the planks at opposite respectively and FIG. 6 and FIG. 7 shows coupling devices connecting two of the neighboring planks respectively.

What is claimed is:

1. A snow chain, comprising:
   a connection set having a plurality of planks, each of which has an arch portion having a curvature and a connection portion having a hook portion, wherein the hook portion is a hole defined in the connection portion;
   a radial chain set having a plurality of radial chains having ends coupled with the planks respectively;
   a main chain coupled with distal ends of the radial chains, wherein the main chain has a hook device to connect opposite ends of the main chain into an annular form;
   a coupling assembly set having a plurality of coupling devices to tighten two of the planks, each of which has a rotary member and a connection member movably mounted on the rotary member, wherein the rotary member is rotated to move the connection member outwardly or inwardly.

2. The snow chain as defined in claim 1, wherein each of said coupling devices further comprises a hook pivoted on an end of the rotary member and the rotary member has a thread hole and the connection member has a hook at an end thereof and a thread section so that the connection member is screwed into the thread hole.

3. The snow chain as defined in claim 1, wherein the connection set further has a plurality of ring devices to couple each two of the neighboring planks.

4. The snow chain as defined in claim 1, wherein the connection set further has a plurality of hook devices to couple each two of the neighboring planks.

* * * * *